United States Patent [19]

Verdier

[11] Patent Number: 5,606,583
[45] Date of Patent: Feb. 25, 1997

[54] GUIDE TUBE FOR A NUCLEAR FUEL ASSEMBLY, AND A METHOD OF MANUFACTURING SUCH A TUBE

[75] Inventor: Michel Verdier, Villeurbanne, France

[73] Assignees: Framatome, Courbevoie; Compagnie Generale des Matières Nuclaires, Belizy Villacoublay, both of France

[21] Appl. No.: 366,298

[22] Filed: Dec. 29, 1994

[30] Foreign Application Priority Data

Dec. 29, 1993 [FR] France .................................... 93 15826

[51] Int. Cl.⁶ .............................. G21C 21/00; G21C 7/20
[52] U.S. Cl. ............................. 376/260; 376/234; 72/367
[58] Field of Search .................................... 376/225, 234, 376/260, 261, 353, 449; 976/DIG. 129; 72/367, 370

[56] References Cited

U.S. PATENT DOCUMENTS

| | | | |
|---|---|---|---|
| 3,448,006 | 6/1969 | Fortescue et al. | 376/234 |
| 4,229,256 | 10/1980 | Luetzow | 376/225 |
| 4,655,990 | 4/1987 | Leclercq | 376/225 |
| 5,068,083 | 11/1991 | John, Jr. | 376/449 |

*Primary Examiner*—Daniel D. Wasil
*Attorney, Agent, or Firm*—Pollock, Vande Sande & Priddy

[57] ABSTRACT

A method of manufacturing a guide tube for a nuclear fuel assembly, in which a tubular blank of constant thickness is prepared, the thickness of the blank is reduced over a fraction of its length in the range 70% to 90% while maintaining a constant inner diameter, and then that section of the blank which has retained its original thickness is forced inwardly by an amount such that a tube is formed which has a constant outside diameter and a variable thickness.

6 Claims, 2 Drawing Sheets

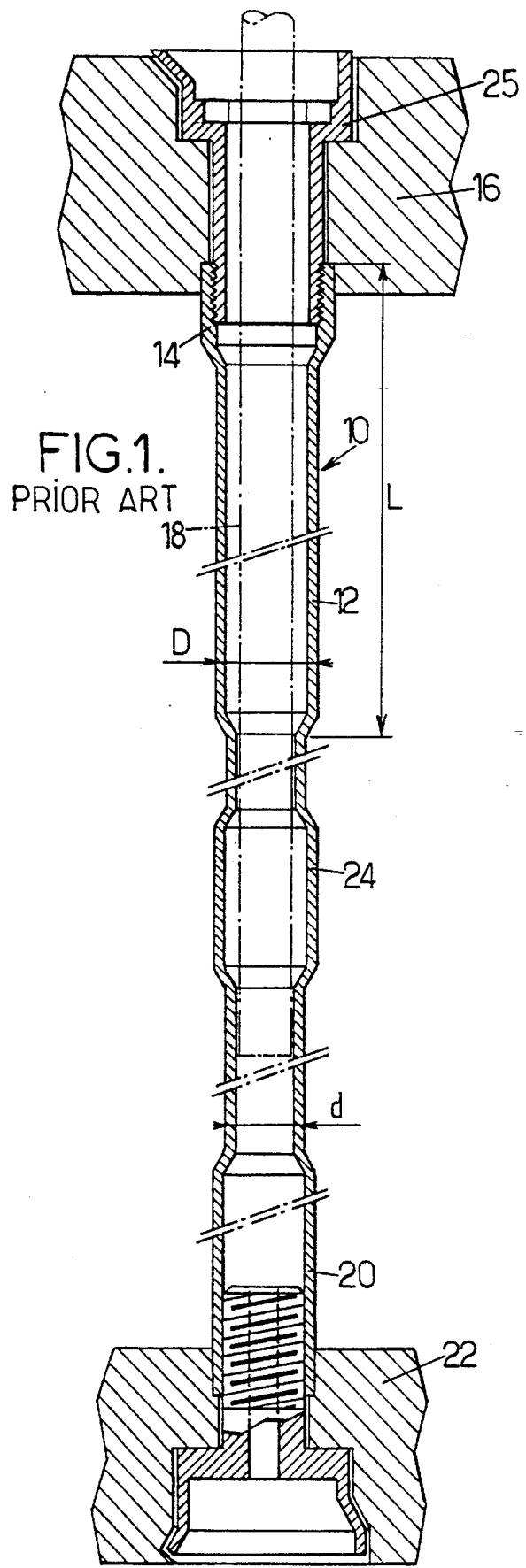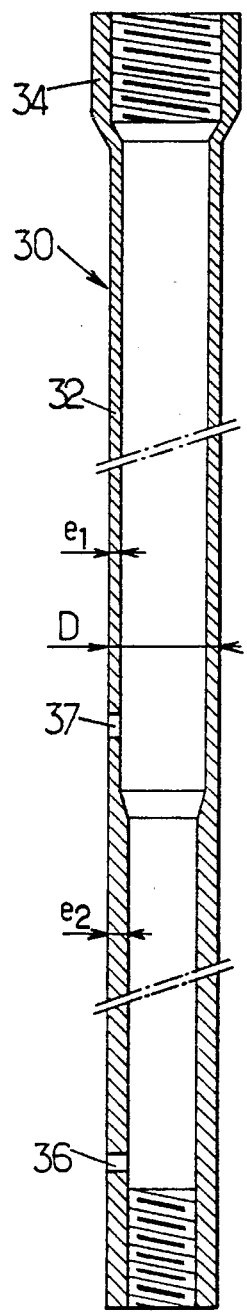

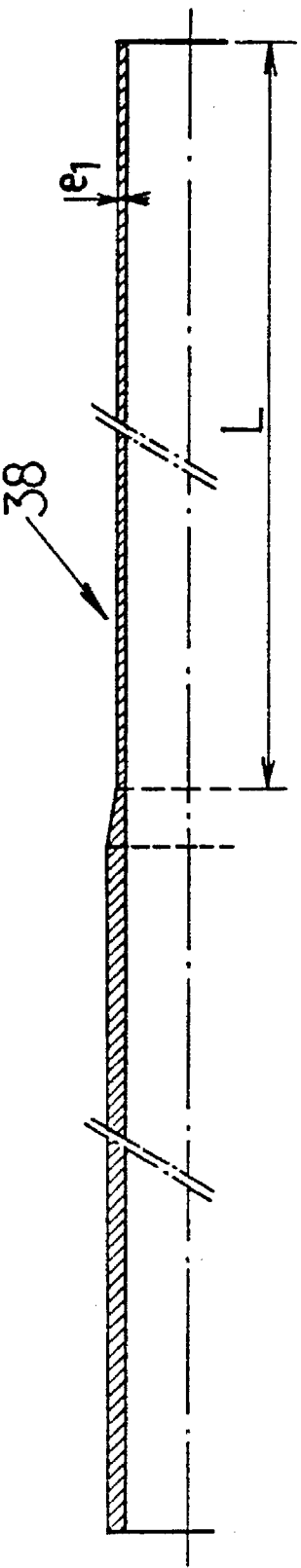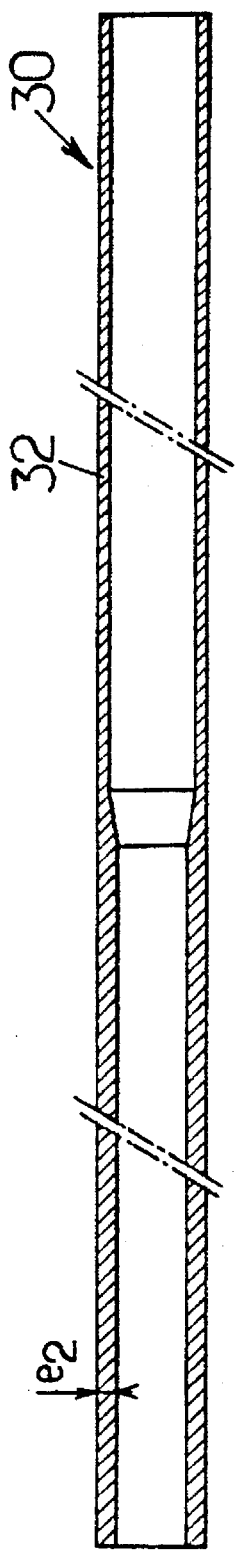

GUIDE TUBE FOR A NUCLEAR FUEL ASSEMBLY, AND A METHOD OF MANUFACTURING SUCH A TUBE

BACKGROUND OF THE INVENTION

The present invention relates to a control rod guide tube designed to be included in the skeleton of a nuclear fuel assembly. It is known that fuel assemblies presently in use include two end pieces interconnected by guide tubes of zirconium-based alloy which generally have grids secured thereto for holding fuel rods in a regular array. At least some of the guide tubes of assemblies placed in a reactor are designed to receive the rods of control clusters as they are lowered. Conventionally, the lower portions of such guide tubes have a narrow zone for the purpose of braking a falling cluster at the end of the displacement thereof by throttling the flow of coolant expelled by the rod, between the rod and the narrow zone.

In the event of clusters falling, this lower portion is subjected to high levels of stress because of the excess hydraulic pressure that then arises. It is also stressed during transient phenomena caused by successively raising the assembly and then allowing it to drop back. While dropping back, the inertia of the assembly runs the risk of causing the weakened portions of the tubes to buckle.

By way of example, FIG. 1 shows the general structure of a guide tube 10 as commonly used at present, and also the manner in which it is fastened. The guide tube is of constant thickness over substantially all of its length. In a running portion 12 whose length L generally constitutes about 80% of the total length of the tube, the nominal outside diameter of the tube is D. In the example shown, the running portion 12 is extended upwards by an enlarged top end zone 14 for attachment to the top end piece 16 of the assembly by means of a screwed socket 25. The major fraction of the length of the lower portion of the guide tube has a smaller diameter d. Because the thickness of the tube is constant, the shrinking of the tube from D to d gives rise to a reduction in the inside diameter thereof. The coolant expelled by the rod 18 moving down along the tube is consequently subjected to considerable head loss once the rod has gone past the running portion 12. The bottom 20 of the tube need not be of reduced size, particularly when the means for fixing it to the bottom end piece 22 are of the kind shown in FIG. 1 where a hollow screw 23 is used to establish a throttled exhaust passage for the coolant, or for attachment to a grid (not shown). The portion 16 may locally present a zone 24 of diameter D, e.g., to enable another grid (not shown) to be fixed thereto.

The means for attaching the guide tube 10 to the end pieces 16 and 22 are of the kind described in FR-A-2 368 785 and 2 465 916, for example, to which reference may be made.

The portion of the guide tube, shown in FIG. 1 whose diameter is reduced to d constitutes a weakened portion that is liable to deform in the event of excessive stress. It might be thought that this risk could be eliminated by locally reducing the inside diameter of the bottom portion of a guide tube having constant diameter D by welding a length of tube inside the lower portion thereof. However, such welding would leave residual stresses that are also harmful, and there would also be geometrical discontinuities of diameter and of straightness.

SUMMARY OF THE INVENTION

An object of the invention is to provide an improved guide tube for a fuel assembly. A more particular object is to avoid or at least reduce the risk of local weakening.

To this end, the present invention provides a guide tube for a control rod in a nuclear reactor fuel assembly, the tube defining a passage which is narrowed in the lower portion of the tube, wherein the outside surface of the tube is cylindrical, except possibly in an end zone for fixing to an endpiece, and in that the wall of the tube is of increased thickness in a lower portion thereof having a length that lies in the range 10% to 30% of the total length of the tube.

The invention also provides a method of manufacturing a guide tube for a control rod in a nuclear reactor fuel assembly, wherein a tubular blank of substantially constant thickness is provided, the thickness of the blank is reduced over a fraction of its length lying in the range 70% to 90% while maintaining a constant inside diameter, and the portion of the blank that has retained its original thickness is urged inwards so as to constitute a tube of constant outside diameter.

The invention will be better understood on reading the following description of a particular embodiment, given by way of example. The description refers to the accompanying drawings.

BRIEF DESCRIPTION OF THE DRAWINGS

FIG. 1 shows the general structure of a prior art guide tube together with means for connecting the tube to the end pieces of an assembly;

FIG. 2 is similar to FIG. 1 and shows a guide tube according to the invention; and FIGS. 3 and 4 are schematic diagrams showing two successive steps in the manufacture of a tube according to the invention.

DETAILED DESCRIPTION

The guide tube 30 shown schematically in FIG. 2 has an outside diameter D that is constant substantially over its entire length, with the exception of an enlarged top end zone 34 for attachment to a top end piece (not shown). The fact that the outside diameter is constant makes it possible to attach grids at any level, by welding or by any other mechanical process, such as crimping or tube expansion. The tube has a running portion 32 of thickness $e_1$ which is generally of the same order as the thickness of a conventional guide tube having the same nominal diameter and the same length. However, the bottom portion of the guide tube 30, which generally occupies 10% to 30% and commonly about 20% of the total length of the tube has an increased thickness $e_2$, so as to define a channel of smaller diameter than the upper portion. The change in thickness from $e_1$ to $e_2$ takes place progressively, e.g., being implemented in the form of a cone whose angle at the apex is about 10°. The difference in thickness ($e_2-e_1$) is selected in proportion to the head loss to be imparted to the rising flow of coolant expelled from the guide tube by the lowering of a control rod. Upstream from the lower narrow portion, i.e., in a central portion of the tube, holes 37 may be provided to allow the coolant to escape in the event of a control rod falling fast. Holes 36 may be formed through the lower portion of the wall of the tube 30 so as to limit the pressure increase and make braking of the rod more progressive as it comes to the end of its stroke.

The top and bottom ends of the guide tube 30 may be different from those shown by way of example in FIG. 2 in order to adapt them to fastening methods other than those shown in FIG. 1.

Various manufacturing methods can be used for making a guide tube of the kind shown in FIG. 2.

In particular, it is possible to start from a blank constituted by a tubular length of constant diameter having a wall thickness substantially equal to $e_2$, which tube is usually made of a zirconium-based alloy having a low neutron capture cross-section. The fraction of the length of the blank that is intended to give rise to the portion 32 is subjected to an operation for reducing its thickness to a value close to $e_1$, by performing one of the conventional techniques for reducing outside diameter. In particular, it is possible to use rotary swaging or cold working which transforms the blank into an intermediate product 38 of substantially constant inside diameter, of the kind shown in FIG. 3.

The intermediate product 38 is then subjected to further treatment designed to provide a tube having constant outside diameter over substantially all of its length. The metallurgical treatment that serves to convert the intermediate product into a guide tube 30 of the kind shown in FIG. 4 may be constituted by rotary swaging enabling the thick portion to be urged towards the inside of the guide tube.

One or both of the end portions of the guide tube may also be shaped, if necessary, depending on the way in which the end pieces are fixed. The tube is subjected to machining and processing operations that are designed to give it a satisfactory surface state. Finally, since the tube obtained by the swaging operations is work-hardened to a great extent, it is generally also subjected to annealing heat treatment.

The guide tube may be made of various zirconium-based alloys that have low neutron absorption. The metallurgical heat treatments applied to the tube during its manufacture depend, to some extent, on the particular alloy chosen.

The guide tubes may be made, in particular, from one of the materials known under the name "Zircaloy-4" having the following composition by weight:

tin: 1.20% to 1.70% iron: 0.18% to 0.24% chromium: 0.07% to 0.13% oxygen: 0.09% to 0.16%, the sum of the iron and chromium contents lying in the range 0.18% to 0.37%, and the remainder being zirconium, apart from unavoidable impurities.

Tubular blanks made of Zircaloy-4, as obtained from ingots, are commercially available in relaxed alpha phase form. Thickness reduction is performed on such blanks in at least two successive stages that are performed cold, with an intermediate recrystallization stage performed by heating to a temperature lying in the range 500° C. to 750° C. for about ten hours. After metallurgical treatment for urging the thick portion inwards, the tube is subjected to final overall treatment which consists in relaxing stresses at a temperature in the range 450° C. to 750° C., often going so far as to achieve full recrystallization, which is obtained by keeping the tube at a temperature in the range 600° C. to 750° C. for a period of one to six hours.

It is also possible to use tubes made of the alloy known as "Zircaloy-2" which includes nickel and which has the following composition in addition to zirconium:

tin: 1.20% to 1.70% iron: 0.07% to 0.20% chromium: 0.05% to 0.15% nickel: 0.03% to 0.08%, with the sum of the iron, chromium, and nickel contents lying in the range 0.18% to 0.38%.

Another usable zirconium alloy has only 0.6% to 3% niobium and 90 ppm to 3000 ppm oxygen, the remainder being constituted by unavoidable impurities. Under such circumstances, the intermediate recrystallization treatments are generally performed in the range 500° C. to 620° C. for a period of one to six hours. The final treatment may be in the same temperature range as when using Zircaloy-4, but is advantageously in the range 500° C. to 595° C.

It is also possible to use quaternary alloys based on zirconium, comprising 0.3% to 1.7% tin, and 0.01% to 0.8% iron, by weight, together with at least one of the following elements:

niobium: 0.30% to 1.50% vanadium: 0.10% to 0.50% chromium: 0.03% to 0.50% oxygen: 0.01% to 0.50%.

In this case, the intermediate annealing operations may be performed for a period of one to six hours in the temperature range 450° C. to 650° C. The final treatment may be constituted by destressing for one to six hours in the range 450° C. to 650° C.

I claim:

1. A method of manufacturing a guide tube for a control rod in a nuclear reactor fuel assembly, comprising the steps of: providing a tubular blank of substantially constant thickness; reducing the thickness of the blank over a fraction of its length lying in the range 70% to 90% while maintaining a constant inside diameter, and forming a section of the blank that has retained its original thickness inwardly to constitute a tube of constant outside diameter and variable thickness.

2. A method according to claim 1, wherein the thickness is reduced and the wall is forced inwardly by rotary swaging.

3. A method according to claim 1, further comprising a final annealing heat treatment at a temperature in the range 450° C. to 650° C. for several hours.

4. A method according to claim 1, wherein said fraction occupies about 20% of the length of the tube.

5. A method according to claim 1, wherein a connecting zone of an inner surface between the section which has retained its original thickness and a remainder of said tube is given the form of a cone having an apex angle of about 10°.

6. A method according to claim 1, wherein said fraction occupies between 10% and about 30% of the length of the tube.

* * * * *

UNITED STATES PATENT AND TRADEMARK OFFICE
CERTIFICATE OF CORRECTION

PATENT NO. :   5,606,583
DATED      :   February 25, 1997
INVENTOR(S):   Michael VERDIER It is certified that error appears in the above-identified patent and that said Letters Patent is hereby corrected as shown below:

```
[73] Assignees:
     line 2, change "Nuclaires" to --Nucleaires--.
```

Signed and Sealed this

Sixteenth Day of December, 1997

Attest:

BRUCE LEHMAN

Attesting Officer    Commissioner of Patents and Trademarks